United States Patent
Sugarbroad et al.

Patent Number: 5,850,609
Date of Patent: Dec. 15, 1998

[54] METHOD FOR LOCATING A CELLULAR RADIOCOMMUNICATION MOBILE STATION, AND EQUIPMENT FOR IMPLEMENTING THE METHOD

[75] Inventors: Ian Sugarbroad, Plano, Tex.; Jean Cellmer, Les Essarts-le-Roi, France; Alain Ohana, Chatillon, France; Phillippe Duplessis, Colombes, France

[73] Assignee: Nortel Matra Cellular, Bois D'Arcy, France

[21] Appl. No.: 676,264

[22] PCT Filed: Jan. 6, 1995

[86] PCT No.: PCT/FR95/00019

§ 371 Date: Nov. 4, 1996

§ 102(e) Date: Nov. 4, 1996

[87] PCT Pub. No.: WO95/19688

PCT Pub. Date: Jul. 20, 1995

[30] Foreign Application Priority Data

Jan. 12, 1994 [FR] France ................................. 94 00271

[51] Int. Cl.$^6$ ................................................... H04Q 7/00
[52] U.S. Cl. ........................... 455/456; 455/422; 455/444; 455/517; 455/575; 340/825.49
[58] Field of Search ..................................... 455/422, 423, 455/432, 433, 435, 444, 456, 457, 517, 575; 340/825.49

[56] References Cited

U.S. PATENT DOCUMENTS

| | | | |
|---|---|---|---|
| 3,913,017 | 10/1975 | Imaseki | 455/422 |
| 5,121,126 | 6/1992 | Clagett | 455/457 |
| 5,539,924 | 7/1996 | Grube et al. | 455/456 |

FOREIGN PATENT DOCUMENTS

| | | | |
|---|---|---|---|
| 505106 A2 | 9/1992 | European Pat. Off. | H04Q 7/04 |
| 0 568 824 | 11/1993 | European Pat. Off. | |
| 3-6929 | 1/1991 | Japan | 455/100 |

OTHER PUBLICATIONS

Klandrud et al., "Beacon control of radio transmitters to reduce radio freqnency interference", Motorola Technical Development, vol. 16, Aug. 1992, pp. 130–132.

Weirs, "Conventional Local Area Radio Coverge System", Motorola Technical Developments, vol. 13, Jul. 1991, pp. 67–69.

*Primary Examiner*—Willis R. Wolfe
*Assistant Examiner*—Hieu T. Vo
*Attorney, Agent, or Firm*—Lee, Mann, Smith, McWilliams, Sweeney & Ohlson

[57] ABSTRACT

At least one fixed beacon is associated with a user of a mobile station and emits, with a range (r) substantially smaller than the characteristic dimension (R) of a cell, a radio signal specific to said user. When the mobile station detects the radio signal emitted by the beacon, the station addresses a signal to the communication network indicating that it is within range of the beacon.

14 Claims, 1 Drawing Sheet

METHOD FOR LOCATING A CELLULAR RADIOCOMMUNICATION MOBILE STATION, AND EQUIPMENT FOR IMPLEMENTING THE METHOD

BACKGROUND OF THE INVENTION

The present invention relates to a method for locating a cellular radio telephone communication mobile station, as well as to equipment serving in this locating.

The known cellular systems make it possible to identify the position of a subscriber at the level of a cell, at least when he sets up a call. The applicant has, however, concluded that it would be desirable to be able to ascertain the position of the subscriber more accurately, in particular to be able to determine with sufficient accuracy whether the subscriber is or is not at home. A benefit of this locating would be that it would enable the subscriber to be offered a privileged service when he is at home and is using his cellular radio telephone. In particular, it would be possible to apply a preferential tariff to the subscriber when he is using his cellular radio telephone from home, and in this way the cellular radio telephone service could compete with the fixed telephone services and have the further advantage, for the users, of not requiring necessarily the deployment of a fixed telephone set in addition to their cellular radio telephone set.

In certain particular cases, cellular systems enable the position of the subscriber to be located by triangulation. Nevertheless, this solution has a few drawbacks:

- on the one hand, triangulation is possible only if the mobile station is within the coverage of at least three cells, which is not generally the case;
- on the other hand, these triangulation methods rely on calculating the time of transmission of the radio signals between the mobile station and the base stations, assuming that transmission is performed by line-of-sight. This is not always true, in particular in an urban environment, and this results in a relatively large uncertainty as to the actual position of the subscriber, this uncertainty being incompatible with the objective indicated above.

EP-A-0 568 824 describes a cellular radio telephone system in which beacons emit signals for locating mobile stations. These beacons each emit characteristic signals for the geographic area in which they are installed. A drawback of this system is that the beacons constitute a further network to be managed by the operator of the cellular network of the base stations. To be able to carry out fine locating of users so as to offer the associated services over a large territorial expanse then poses a serious problem to the operator since he must have the use of numerous public sites to install such beacons.

SUMMARY OF THE INVENTION

An aim of the invention is to propose a method of location making it possible to obtain in a reliable manner the certainty that the subscriber is at home, or in the very near vicinity thereof.

The invention thus proposes a method for locating a cellular radio telephone communication mobile station, characterized in that at least one fixed beacon is associated with a user of the mobile station and emits, with a range substantially smaller than the characteristic dimension of a cell, a radio signal specific to the said user, and in that, when the mobile station picks up the radio signal emitted by the beacon, it addresses a signal to the communication network indicating that it is within range of the beacon.

The emitting range of the beacon will typically be that of a fixed cordless telephone set, that is to say less than around 300 meters, allowing coverage of an area corresponding to the user's home or place of work. The user may moreover deploy several beacons, if he wishes to have the use of a more expanded coverage, or if he wishes to have several local connection areas (main home and secondary residence for example).

The fixed beacon preferably emits its radio signal on the same frequency band as the down communications from the base stations of the cellular network to the mobile stations. It is particularly beneficial to provide for the radio signal to be emitted by the beacon according to the format of a channel for broadcasting from a base station of the network to mobile stations. In this case, the mobile station listens in to the channel on which its associated beacon is emitting in the same way as it listens in to a base station of the network, thus simplifying the equipment required to detect the radio signal from the beacon.

The second aspect of the invention concerns a radio telephone equipment for a user of a cellular radio communication network, comprising a mobile station able to communicate with base stations of the network, characterized in that it furthermore comprises at least one fixed beacon emitting, with a range substantially smaller than the characteristic dimension of a cell of the network, a radio signal specific to the user, the mobile station being contrived to be responsive to the radio signal emitted by the beacon and, in response to the detecting of this radio signal, to address a signal to the base station with which it is communicating, indicating that it is within range of the beacon.

Finally, according to a third aspect, the invention proposes a radio beacon for locating a cellular radio telephone communication mobile station, characterized in that it comprises means for emitting, with a range substantially smaller than the characteristic dimension of a radio telephone network cell, a radio signal specific to the user according to the format of a channel for broadcasting from a base station of the cellular network to mobile stations.

BRIEF DESCRIPTION OF THE DRAWINGS

Other features and advantages of the present invention will emerge in the description below of a preferred but non-limiting exemplary embodiment, with reference to the attached drawings in which.

DESCRIPTION OF THE PREFERRED EMBODIMENT

Figure 1:
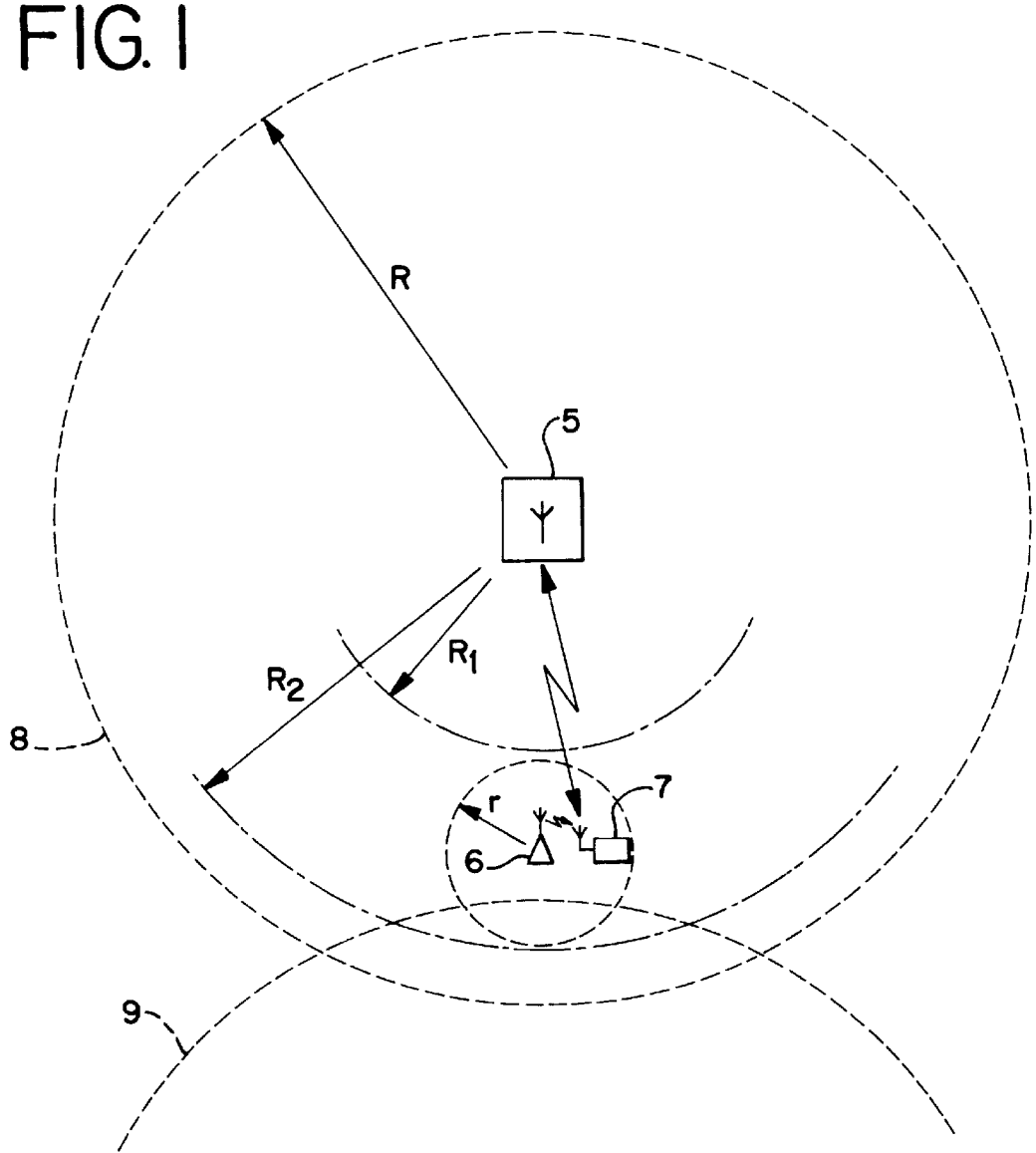
FIG. 1 is a diagram illustrating the communications between a base station, a mobile station and a beacon according to the invention.

In a cellular radio telephone system, base stations 5 are distributed over the territory to be covered, which is thus divided into cells. Of course, the representation of the cells 8, 9 in FIG. 1 is purely symbolic, insofar as the actual cells are not in general circular, and the cell boundaries are not geometrically well defined bearing in mind the characteristics of radio propagation. The characteristic dimension R of a cell is the maximum distance between its base station and a mobile station which is able to communicate therewith. This characteristic dimension R typically lies between around 1 km for microcells in an urban environment and around 35 km for cells in a rural environment. In all cases, these characteristic dimensions are too large for the locating of a mobile station within a cell to make it possible to determine whether the mobile station is at the user's home.

FIG. 1 shows a fixed beacon 6 installed at the home of the user of a mobile station 7. The beacon 6 emits a short-range radio signal characteristic of the user. The emitting range r of the beacon 6 is less than 300 meters so as to be substantially smaller than the characteristic dimension R of any cell of the network. The fact of whether or not the mobile station 7 picks up this radio signal characteristic of the user makes it possible to determine whether the mobile station is within range of the beacon 6, this being equivalent to the fact that the user is employing his mobile station from home. The emitting power of the beacon is less than around 200 mW, typically 50 mW.

In all modern cellular radio telephone systems, in particular systems using a method of time-division multiple access (TDMA), the mobile stations analyze a broadcasting channel on which the base station of the cell in which they are located is emitting, and they are also capable of analyzing the broadcasting channels which they receive from base stations of other cells, so as to allow handover when the mobile station changes cell. This is particularly the case with GSM, DCS cellular systems and derived systems more particularly relating to the description below. For a general description of the GSM system, reference may be made to the article "Le système cellulaire numérique européen de communication avec les mobiles" [The European digital cellular system for communication with mobiles] by B. Ghillebaert et al., published in l'Echo des Recherches No. 131, 1st quarter 1988, pages 5–16.

In the GSM or DCS system, the broadcasting channel BCCH consists of a particular time slot of each TDMA frame emitted by the base station. The frequency of emission on the broadcasting channel BCCH is fixed for each base station, but varies from one base station to another. This enables the mobile station, in time slots other than those reserved for it, to monitor the other broadcasting channels so as to determine the base station affording the best quality of reception. The radio signal emitted by the beacon 6 can therefore be emitted according to the format of a broadcasting channel BCCH without raising the complexity of the mobile station 7 excessively.

Figure 2:
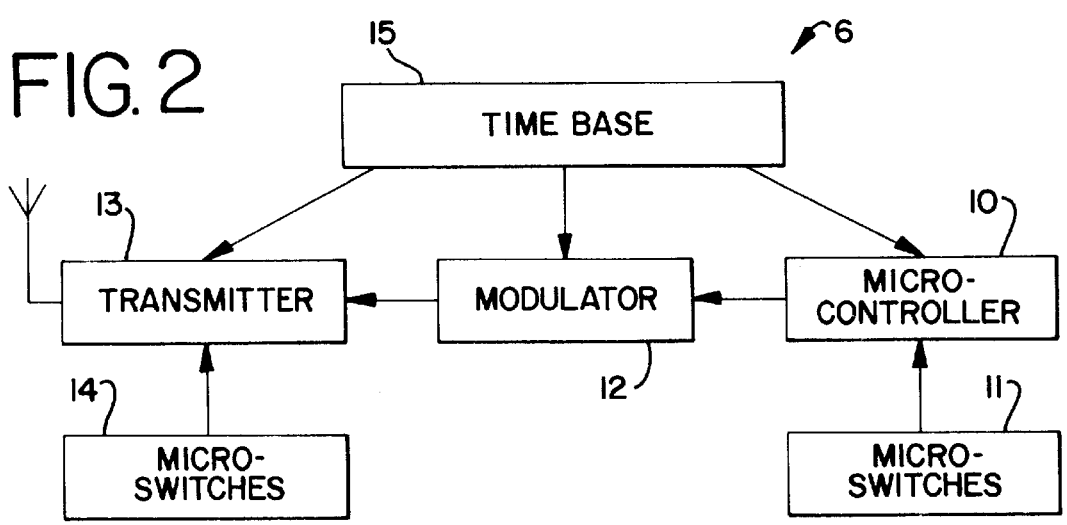
FIG. 2 is a schematic diagram of a locating beacon according to the invention.

The beacon 6 can be constructed according to the schematic diagram represented in FIG. 2. The micro-controller 10 produces the binary sequence characteristic of a broadcasting channel BCCH of the system, including therein a signal identifying this sequence as originating from a fixed beacon, and furthermore including therein a datum for identifying the beacon read out on an interface which can be modified at installation, consisting for example of a series of micro-switches 11. The modulator 12 formats the binary sequences coming from the micro-controller according to the mode of transmission of the system (GMSK modulation in the case of GSM or DCS). The transmitter 13 transposes the signal from the modulator 12 to one of the channel frequencies of the system. This frequency is defined when installing the beacon by a suitable interface such as a series of micro-switches 14 so as to be different from each of the broadcasting frequencies BCCH used by the base stations with which the mobile station 7 is liable to communicate when it is within range of the beacon 6. The micro-controller 10, the modulator 12 and the transmitter 13 are clocked in tempo with the TDMA frames of the system by a time base 15 with the requisite stability.

Once installed at the user's home (or at his place of work, or again anywhere which he indicates), the beacon 6 is sealed up in such a way that it is irremovable and that access to the micro-switches 11, 14 is impossible.

As the beacon 6 emits on the same frequency band as the base stations 5, its use does not necessitate modification of the radio stage of the mobile station 7. And as the emission format is the same as that of the BCCH channels, the baseband demodulation by the mobile station is likewise unchanged. The mobile station need only be programed to allow the exchanges of signals indicated below.

The datum for identifying the beacon is likewise stored in the mobile station 7. In the case of GSM or DCS, a mobile station is composed of standard mobile equipment associated with a subscriber identity module (SIM). The most convenient procedure is then to store the datum for identifying the beacon in a writeable memory area of the SIM module. When a mobile station 7 picks up a radio signal identified as originating from a fixed beacon 6, it compares the identification datum received from the beacon with that stored in its SIM module. The presence of its associated beacon is detected in the event of agreement. The mobile station then informs the user that he is within range of the beacon, for example by displaying a corresponding message, to enable the user to ascertain the tariff which will be applied to him if he sets up a communication. On the other hand, if the user sets up or receives a radio telephone communication, the mobile station 7 transmits a signal to the network indicating that the mobile station is within range of its associated beacon.

In the case of an up call from the mobile station 7, the random access request emitted by the mobile station on the RACH channel of the cell in which it is registered includes an indication according to which it is within range of the beacon 6. A dedicated signaling channel (SDCCH), is then allocated to the mobile station, and the communication is set up in a conventional manner, but a preferential tariff is applied to the user.

In the case of a down call destined for the user, the base stations firstly search out the user's mobile station (paging), and the random access request emitted by the mobile station 7 in response to this search includes an indication according to which the mobile station is within range of the beacon. A dedicated channel (SDCCH) is then allocated to the mobile station, and the communication is set up in a conventional manner, applying as the case may be a preferential tariff to the party who requested the communication.

The benefit will be noted of the indicating by the mobile station of a call, requested or received, of residential type (within range of the beacon) right from the first contact of the mobile station with the network. This makes it possible for example, if the operator so wishes, to give priority assignment of a particular resource to this type of communication. This indicating is possible in the random access channel RACH in a GSM or DCS type system, by using reserve codes available for this type of application.

To minimize the risks of fraud, provision may be made for the network to check the location ensuing from the indication supplied by the mobile station 7.

The network includes a home location register (HLR), a database in which is stored the user-specific information. This information can include:

an indication of the entitlement of the user to the preferential tariff,
  the datum for identifying the beacon of the user,
  the number of the base station of the cell in which the beacon is installed, together with as the case may be the numbers of the other base stations with which the mobile station of the user can communicate when it is within range of the associated beacon (in the example shown diagrammatically in FIG. 1, the HLR will store the number of the base station 5 of the cell 8 in which the beacon 6 is installed, together with the number of the base station of the cell 9 with which the mobile station 7 can communicate when in range of the beacon 6), and, optionally, for each base station listed under the previous item, a distance bracket [$R_1$, $R_2$] into which the distance between the base station and the mobile station is liable to fall when the mobile station is within range of its associated beacon (FIG. 1). The bracket of values [$R_1$, $R_2$] will in general be centered on the distance between the base station 5 and the fixed beacon 6 (typically known with an uncertainty of less than 1 km when installing the beacon), and will be of a width which takes into account the emitting range r of the beacon 6 and the possibility of indirect propagation paths between the base station and the mobile station (typically $R_2-R_1 \approx 2$ km).

The data above are copied into the visitors location register (VLR) on which depends the cell in which the mobile station 7 is registered. When a base station controller (BSC) receives from a mobile station a random access request including an indication of location within range of the associated beacon, it interrogates the VLR (via the mobile service switching center MSC) which returns the above data. The BSC then carries out the following checks:

it checks whether the user is indeed entitled to the preferential tariff, it checks whether the base station which forwarded the random access request is indeed one of those whose number has been registered, and, as the case may be, it checks whether the estimated distance between this base station and the mobile station is compatible with the bracket [$R_1$, $R_2$]. This distance is estimated by the base station, as provided for in the context of GSM or DCS, on the basis of the synchronization delay of the random access channel RACH.

To further reduce the risks of fraud and ease the management of the system, it is further possible to prohibit handovers between base stations when dealing with a communication of residential type.. This can be carried out at the network level, or else by preventing the mobile station from transmitting during the residential type communication the radioelectric field values received from the neighboring cells (an obligatory step in the handover procedure).

It is advantageous to download the datum for identifying the beacon into the SIM module of the mobile station from the network during a location update. This downloading can be carried out in the same way as that of the temporary mobile subscriber identity (TMSI) in the case of GSM or DCS in which the location updates are performed periodically or when the mobile station changes cell. This arrangement avoids having to intervene directly in the SIM module when allocating a new fixed beacon to a user.

So as not to escalate the apparatus which the user needs to deploy, the beacon 6 can advantageously be incorporated into the same housing as the device for the electrical charging of the battery of the mobile station 7, although this housing has to be sealed in an irremovable manner.

Whereas the invention has been described in its application to a particular procedure for placing tariffs on communications, it will be understood that the method for locating mobile stations can embrace numerous other applications immediately the location information presents a benefit. It may in particular serve to authorize access to particular services, or else to intervene in the priorities of assignment of radio resources.

We claim:

1. Method for locating a cellular radio telephone communication mobile station, comprising associating at least one fixed beacon with a user of the mobile station, emitting from the fixed beacon, with a range (r) substantially smaller than a characteristic dimension (R) of cell, a radio signal specific to said user, and, when the mobile station picks up the radio signal emitted by the beacon, addressing a signal to communication network indicating that the mobile station is within range of the fixed beacon.

2. Method according to claim 1, in which the emitting of the radio signal by the fixed beacon is performed in a same frequency band as communications from the base stations of the communication network to the mobile stations.

3. Method according to claim 2, in which said radio signal is emitted by the beacon according to a format of a channel for broadcasting from a base station of the cellular network to mobile stations.

4. Method according to claim 1, in which the signal addressed to the network by the mobile station to indicate that it is within range of its associated beacon is emitted on a random access channel when setting up a communication involving said mobile station.

5. Method according to claim 1, in which the radio signal emitted by the beacon includes a datum for identifying the beacon allocated to the user and stored in the mobile station, and in which the mobile station emits the signal indicating that it is within range of the beacon only after having checked that the beacon identification datum included in the radio signal which it receives from the beacon corresponds to that which it has in memory.

6. Method according to claim 5, in which the datum for identifying the beacon is stored in a database of the communication network, and is down-loaded from the communication network to the mobile station during a location update.

7. Method according to claim 5, in which the communication network includes a database in which the datum for identifying the beacon is stored together with at least one number of a base station liable to communicate with the mobile station when the later is within range of the fixed beacon, and in which the network checks that the signal emitted by the mobile station to indicate that it is within range of the beacon has been received by a base station whose number is stored correspondingly with the datum for identifying the beacon.

8. Method according to claim 7, in which, in addition to each number of a base station liable to communicate with the mobile station when the latter is within range of the fixed beacon, the datum for identifying the beacon is stored together with a distance bracket which may separate said base station from the mobile station when the latter is within range of the beacon, in which each base station communicating with the mobile station determines the distance which separate it from this mobile station, and in which the network checks compatibility between the determine distance and the stored distance bracket.

9. Method according to claim 7, in which the checking of location by the communication network is performed at the level of a base station controller of the network.

10. Method according to claim 1, in which the emission range (r) of the beacon is less than about 300 meters.

11. Method according to claim 1, in which the emitting power of the beacon is less than about 200 mW.

12. Radio telephone equipment for a user of a cellular radio communication network, comprising a mobile station able to communicate with base stations of the network, at least one fixed beacon emitting, with a range (r) substantially smaller than a characteristic dimension (R) of a cell of the network, a radio signal specific to the user, the mobile station having means to detect the radio signal emitted by the beacon and, in response to the detecting of this radio signal, to address a signal to the base station with which it is communication, indicating that the mobile station is within range of the beacon.

13. Equipment according to claim 12, in which the fixed beacon is constructed inside a common housing together with a device for electrical charging of a battery of the mobile station.

14. Radio beacon for locating a cellular radio telephone communication mobile station, comprising means for emitting, with a range (r) substantially smaller than a characteristic dimension (R) of a radio telephone network cell, a radio signal specific to a user according to a format of a channel for broadcasting from a base station of the cellular network to mobile stations.

* * * * *